3,328,336
POLYVINYL ACETATE PLASTICIZED WITH ALKYLATED BENZOPHENONES

Howard F. Reeves, Jr., Raymond W. Ingwalson, and Glendon D. Kyker, Chattanooga, Tenn., assignors, by mesne assignments, to Velsicol Chemical Corporation, a corporation of Tennessee
No Drawing. Filed May 27, 1963, Ser. No. 283,621
3 Claims. (Cl. 260—32.8)

This invention relates to plasticized compositions and is more particularly concerned with polyvinyl acetate plasticized with alkylated benzophenones.

In the past, polyalkylated benzophenones have been employed as plasticizers for polyvinyl chloride. U.S. Patents 2,580,300 and 2,580,301, for example, for example, relate to such a product. The latter patent teaches the use of a ketone containing an average of two-nine carbon aromatic groups for a plasticizer, the ketone being produced by the reaction with phosgene of a petroleum hydrocarbon fraction. Heretofore, to the best of our knowledge, no aromatic ketone has been used to plasticize polyvinyl acetate.

The present invention uses a plasticizer having properties which are superior to the plasticizers of the prior art and being suitable for admixture with polyvinyl acetate. In such an admixture, the ketones of the present invention exhibit extraordinary vapor pressure properties which are wholly unexpected.

For example, the vapor pressures of the low molecular weight alkyl substituted benzophenones of the present invention are higher than the vapor pressures of the usual polyvinyl acetate plasticizers, and, therefore, such benzophenones would be expected to be unsuitable as plasticizers for polyvinyl acetate. Contrary to what would be expected, the volatility of such alkyl substituted benzophenones, though being appreciably greater than the volatility of dibutyl phthalate, in an open dish, is comparable thereto when in admixture with polyvinyl acetate. While the reason for this marked reduction in volatility is not understood by us, it may involve an intermolecular attraction between the polyvinyl acetate and the aromatic benzophenones whereby the volatility of such benzophenones is reduced. Table I illustrates the relative volatility between the benzophenones of the present invention and conventional plasticizers, namely dibutyl phthalate and hydrogenated terphenyl.

TABLE I

| Plasticizer | Open Dish Volatility, Percent Weight Loss | Volatility in PVA Film, Percent Weight Loss [1] | |
|---|---|---|---|
| | | 10 phr.[2] | 30 phr.[2] |
| Methyl benzophenone | 40.1 | 4.1 | 4.6 |
| Dimethyl benzophenone (prepared from o-xylene) | 35.8 | 4.1 | 5.2 |
| Dimethyl benzophenone (prepared from m-xylene) | 35.8 | 4.1 | 5.2 |
| Dimethyl benzophenone (prepared from p-xylene) | 40.7 | 4.1 | 4.8 |
| Dimethyl benzophenone (prepared from mixed xylene) | 40.3 | 4.0 | 5.1 |
| Dibutyl phthalate | 11.7 | 2.7 | 5.4 |
| Hydrogenated terphenyl | 14.9 | 5.1 | |

[1] Percent of total weight.
[2] Parts per hundred parts resin.

The values in Table I were determined as follows:

Open dish volatility

Open dish volatility was determined by accurately weighing approximately 10 grams of the plasticizer into a glass dish (50 mm. diameter x 15 mm.) and placing on a rotating platform in a forced draft oven at 125° C. for twenty-four hours. After cooling in a desiccator, the sample was reweighed and the percent weight loss reported.

Volatility in PVA film

The volatility in PVA film was determined on 3" x 6" strips 4.5 mils thick prepared as described in column 5. The strips were preconditioned by exposure to 100° C. for twenty minutes to completely remove moisture. They were then weighed on an analytical balance and immediately suspended from a rotating vertical shaft in a forced draft oven maintained at 100° C. After seven hours exposure, the strips were removed from the oven and immediately reweighed to determine the weight loss due to plasticizer evaporation. The weight loss was reported as percent of the original film weight.

The approximate isomeric composition of the above benzophenones was:

| Methyl benzophenone: | Percent |
|---|---|
| 4-methyl benzophenone | 78.3 |
| 2-methyl benzophenone | 19.2 |
| 3-methyl benzophenone | 2.5 |
| Dimethyl benzophenone (prepared from o-xylene): | |
| 2,4-dimethyl benzophenone | 4.0 |
| 2,5-dimethyl benzophenone | Trace |
| 3,4-dimethyl benzophenone | 84.0 |
| 2,3-dimethyl benzophenone | 12.0 |
| Dimethyl benzophenone (prepared from m-xylene): | |
| 2,4-dimethyl benzophenone | 93.0 |
| 2,5-dimethyl benzophenone | 0.2 |
| 2,6-dimethyl benzophenone | 6.0 |
| Others | Trace |
| Dimethyl benzophenone (prepared from p-xylene): | |
| 2,5-dimethyl benzophenone | 99+ |
| 2,4-dimethyl benzophenone | <1 |
| Dimethyl benzophenone (prepared from a mixed xylene): | |
| 2,4-dimethyl benzophenone | 67 |
| 2,5-dimethyl benzophenone | 28 |
| 2,6-dimethyl benzophenone | 3.5 |
| 3,4-dimethyl benzophenone | 0.2 |
| Ethyl benzophenone | 0.7 |

In more detail, we have found that these alkylated benzophenones when in admixture with polyvinyl acetate not only become appreciably less volatile, but impart to the polyvinyl acetate other desirable properties to be described hereinafter. Such alkylated benzophenones are compatible with polyvinyl acetate up to approximately equal parts by weight. In general, the usual plasticizer to resin ratio may be varied from about 1:10 to about 1:1, by weight, depending upon the properties desired and the molecular weight of the plasticizer being used. These plasticizers can be used as the sole plasticizer or blended with other plasticizers.

Of the alkyl substituted benzophenones, we prefer to use dimethyl benzophenone as a plasticizer. The dimethyl benzophenone may either be a pure isomer or a mixture of isomers. The monomethyl benzophenone is also a highly useful plasticizer. Such relatively low molecular weight benzophenones, as the dimethyl benzophenone and the monomethyl benzophenone, may be incorporated in the polyvinyl acetate up to a ratio of 1:1 by weight. The high molecular weight alkyl substituted benzophenones having up to and including five carbons in the alkyl groups have sufficient compatibility with polyvinyl acetate to be effective plasticizers.

The amount of alkyl substituted benzophenone that is useful in plasticizing polyvinyl acetate depends on the specific resin and the end use involved. In certain hot melt adhesive compositions, it may be desirable to use in the range of 5 to 40 parts alkyl substituted benzophenone to 100 parts of resin. In polyvinyl acetate emulsions for adhesives and coatings, the plasticizer content may vary from 5 to 40 parts per 100 parts of resin. When extremely tacky compositions are desirable, up to 100 parts of plasticizer per 100 parts of resin, in the form of emulsion, solution or hot melt may be required.

Alkyl substituted benzophenones that are not compatible to the extent of 30 parts per 100 parts of resin are not considered primary plasticizers for polyvinyl acetate. Lack of compatibility at 30 phr. is an indication of poor solvating properties for the resin and may result in surface oiliness and loss of bond strength in the case of adhesives and coatings on prolonged ageing even if used in lesser amounts. On the other hand, those alkyl substituted benzophenones that show compatibility at 30 phr. or higher have utility at 10 phr. levels without danger of bond failure on ageing.

The solid aromatic ketones, as benzophenone and tetramethyl benzophenone, are not desirable plasticizers due to their tendency to crystallize in the polyvinyl acetate film. Hence, if it is desired to use either benzophenone or tetramethyl benzophenone as plasticizers, they should be incorporated with other plasticizers so as to constitute only a minor amount of the total plasticizer present in the film.

We have found that liquid alkyl substituted benzophenones (which are liquid at 25° C.) having from one through five carbon atoms in the alkyl groups are particularly well suited as a plasticizer for polyvinyl acetate.

To produce these alkyl substituted benzophenones (except trimethylphenyl trimethylphenyl ketone), we react the aromatic acid chloride with the corresponding aromatic hydrocarbon or substituted aromatic hydrocarbon in the presence of a metallic chloride catalyst such as $AlCl_3$, $FeCl_3$, or $ZnCl_2$. After the reaction has taken place, the reaction mass is washed, i.e., commingled with water to dissolve out the metallic chlorides and other water soluble substances, the water being removed from the chemicals by decantation. Next, the reaction mass is distilled to recover as a condensation product the alkylated benzophenone.

In producing the alkyl substituted benzophenones, the following aromatic acid chlorides were found suitable: benzoyl chloride, o-toluyl chloride, m-toluyl chloride, p-toluyl chloride and p-tert.-butyl benzoyl chloride. The following aromatic hydrocarbons are suitable for reactions with the above listed aromatic acid chlorides: benzene, toluene, o-oxylene, m-xylene, p-xylene, mixed xylene (70.8% meta; 27.9% para; 0.3% ortho; and 1.0% ethyl benzene), trimethyl benzene (a mixed $C_9$ petroleum fraction), ethyl benzene, cumene, pseudocumene, diethyl benzene, p-cymene, p-tert.-butyl toluene, dodecylbenzene, octyl toluene, sec.-butyl benzene and durene.

To produce the trimethylphenyl trimethylphenyl ketone, we mixed trimethylbenzene with phosgene to obtain isomeric mixtures which were used in the evaluations of Example 1 and Table 11.

As stated above, we have found that alkyl substituted benzophenones in which from one through five carbon atoms are substituted on the rings produce suitable plasticizers.

To test the compatibility of the alkyl substituted benzophenones with polyvinyl acetate, the procedure of Example 1 was followed.

EXAMPLE 1

*Compatibility test*

The selected alkyl substituted benzophenone, a compatible solvent and polyvinyl acetate (Bakelite AYAA, Blend 999) were thoroughly mixed to form a solution, the polyvinyl acetate having been dissolved in the solvent prior to the addition of the alkyl substituted benzophenone thereto. Several such solutions were produced containing each alkyl substituted benzophenone to be tested, the alkyl substituted benzophenones being respectively 100 parts, 30 parts, 20 parts and 10 parts per 100 parts by eight of the resin.

The solutions were then poured onto glass plates to produce wet films having thicknesses of 20–25 mils. The films were then dried for 24 hours at room temperature followed by an additional three hours drying at 50° C. By such a procedure, the solvent was evaporated from the film. The solvent-free film was then allowed to cool at room temperature and then observed for compatibility.

The results of the compatibility observations are given in Table 11 thereof.

TABLE II.—EXAMPLES OF COMPATIBILITY WITH PVA (BAKELITE AYAA, BLEND 999)

| Ketones | Total No. of Carbon Atoms in Alkyl Substituents | Parts/100 Parts Resin | | | |
|---|---|---|---|---|---|
| | | 100 | 30 | 20 | 10 |
| Benzophenone | 0 | I | C | | |
| Methyl benzophenone | 1 | C | | | |
| Diemthyl benzophenone (from mixed xylene) | 2 | C | | | |
| Dimethyl benzophenone (from o-xylene) | 2 | C | | | |
| Dimethyl benzophenone (from m-xylene) | 2 | C | | | |
| Dimethyl benzophenone (from p-xylene) | 2 | C | | | |
| Ethyl benzophenone | 2 | C | | | |
| Trimethylphenyl phenyl ketone | 3 | C | | | |
| Isopropyl benzophenone | 3 | C | | | |
| Tolyl dimethylphenyl ketone | 3 | C | I | I | C |
| Tetramethylphenyl phenyl ketone | 4 | I | | | |
| Diethylphenyl phenyl ketone | 4 | I | C | | |
| Sec-butyl benzophenone | 4 | C | | | |
| Tolyl trimethylphenyl ketone | 4 | C | | | |
| Methylpropylphenyl phenyl ketone | 4 | I | C | | |
| Tolyl diethylphenyl ketone | 5 | I | C | | |
| p-Tert-butyltolyl phenyl ketone | 5 | I | C | | |
| Trimethylphenyl trimethylphenyl ketone | 6 | I | I | C | |
| 4-tert-Butylphenyl dimethylphenyl ketone | 6 | I | I | C | |
| 4-tert-Butylphenyl trimethylphenyl ketone | 7 | I | I | C | |
| Duryl p-tert-butylphenyl ketone | 8 | I | I | I | I |
| Octylmethylphenyl phenylketone | 9 | I | I | I | I |
| Dodecyl benzophenone | 12 | I | I | I | I |

In the above Table II, C indicates that the ketone and resin were compatible, producing a glass clear film. Haziness and an opaque film was considered incompatible and designated with the notation I.

The physical properties of the various plasticizers of the present inventions are listed in the following Table III.

TABLE III.—PHYSICAL PROPERTIES OF ALKYL SUBSTITUTED BENZOPHENONES

| Ketone | Sp. Gr. at 25° C. | Refractive Index at 25° C. | Boiling Range at mm. Hg |
|---|---|---|---|
| Benzophenone | | | 108/1 |
| Methyl benzophenone | 1.0810 | 1.5478 | 135–45/2 |
| Dimethyl benzophenone (from mixed xylene) | 1.0640 | 1.5890 | 140–2/2 |
| Dimethyl benzophenone (from o-xylene) | 1.0728 | 1.5988 | 150–5/1 |
| Dimethyl benzophenone (from m-xylene) | 1.065 | 1.5885 | 130/1 |
| Dimethyl benzophenone (from p-xylene) | 1.0616 | 1.5865 | 133–43/1 |
| Ethyl benzophenone | 1.0631 | 1.5880 | 132/5 |
| Trimethylphenyl phenyl ketone | 1.0511 | | 145–55/1 |
| Isopropyl benzophenone | 1.0448 | 1.5818 | 135–40/1 |
| Tolyl dimethylphenyl ketone | 1.0427 | 1.5838 | 155/1.5 |
| Tetramethylphenyl phenyl ketone | | | 220–8/29 |
| Diethylphenyl phenyl ketone | 1.331 | 1.5748 | 140–62/0.6 |
| Sec-butyl benzophenone | 1.0318 | 1.5747 | 150–60/1 |
| Tolyl trimethylphenyl ketone | 1.0410 | 1.5812 | 172–81/1 |
| Methylpropylphenyl phenyl ketone | 1.0276 | 1.5690 | 155–8/2 |
| Tolyl diethylphenyl ketone | 1.0222 | 1.5725 | 153–67/1 |
| p-Tert-butyltolyl phenyl ketone | 1.0263 | 1.5650 | 142/1 |
| 4-tert-butylphenyl dimethylphenyl ketone | 1.0114 | 1.5678 | 176/0.7 |
| Octylmethylphenyl phenyl ketone | 0.9879 | 1.5501 | 175–87/1 |
| Dodecyl benzophenone | 0.9768 | 1.5440 | 179–204/1 |

Samples of the various plasticized compositions were made according to the procedure of Example 11 for providing data for Table I and Table IV hereof.

EXAMPLE 11

Ten parts of plasticizer to be evaluated was slowly added to 100 parts of Elvacet 81–900 emulsion (a polyvinyl acetate homopolymer emulsion containing 55% solids, manufactured by Du Pont) which was mechanically agitated. The mixture was stirred for ten minutes after the final addition of the plasticizer.

After mixing, the mixture was placed in a ball mill and ground therein for approximately one hour to insure uniform distribution of the plasticizer in the resin emulsion. The mixture was then deaerated by letting it stand overnight.

The plasticized emulsion was then drawn down on sheets of Mylar (polyester) to a wet thickness of six mils. The film was permitted to dry (dry thickness 4.5 mils) and carefully stripped from the Mylar sheet. These strips were used for the tests reported in Table I hereof.

The 4.5 mil films were not thick enough for the tests for Table IV and therefore several 4.5 mil films from the same sample were laminated together to provide a 20 mil thick film. Lamination was effected by subjecting a stack of 4.5 mil films to 1,000 p.s.i. pressure at 110°–120° C. for approximately thirty seconds in a mold. This was followed by rapidly cooling the film to about 40° C. while still under pressure. The laminated film was then removed from the mold and conditioned for four days at 76° F. and 50% relative humidity. The laminated film was thereafter subjected to the following tests: for modulus at 100% elongation, ultimate tensile, and percent elongation at break tests. The results of the tests are recorded in Table IV.

TABLE IV.—PHYSICAL PROPERTIES OF PVA (ELVACET 81–900*) RESIN PLASTICIZED AT 10 PHR. LEVEL

| Ketone | 100% Modulus | Tensile | Percent Elongation |
|---|---|---|---|
| Methyl benzophenone | 866 | 1,422 | 280 |
| Dimethyl benzophenone (from mixed xylene) | 837 | 1,351 | 280 |
| Dimethyl benzophenone (from o-xylene) | 900 | 1,299 | 265 |
| Dimethyl benzophenone (from m-xylene) | 860 | 1,423 | 290 |
| Dimethyl benzophenone (from p-xylene) | 819 | 1,409 | 280 |
| Ethyl benzophenone | 785 | 1,390 | 300 |
| Trimethylphenyl phenyl ketone | 1,091 | 1,356 | 250 |
| Isopropyl benzophenone | 1,084 | 1,471 | 270 |
| Tolyl dimethylphenyl ketone | 1,094 | 1,554 | 270 |
| Diethylphenyl phenyl ketone | 886 | 1,595 | 295 |
| Tolyl trimethylphenyl ketone | 1,453 | 1,522 | 260 |
| Tolyl diethylphenyl ketone | 907 | 1,425 | 260 |
| p-Tert-butyltolyl phenyl ketone | 847 | 1,515 | 270 |

*A commercial polyvinyl acetate emulsion (55% solids) manufactured by Du Pont.

It will be obvious to those skilled in the art that there are a number of prior art processes reported in the literature for producing the various ketones here disclosed and therefore the present invention is not limited to the details relating to the process employed for producing the ketones. It is also obvious to those skilled in the art that many variations may be made in the embodiments chosen for the purpose of illustrating the present invention without departing from the scope thereof as defined by the appended claims.

We claim:
1. A plasticized composition comprising polyvinyl acetate resin homopolymer plasticized with an alkyl substituted benzophenone, the alkyl substituents containing from one through five carbon atoms as the total number of carbon atoms in all the alkyl substituents with a maximum of three of said alkyl substituents contained on any one benzene ring.

2. A plasticized composition comprising polyvinyl acetate resin homopolymer plasticized with an alkyl substituted benzophenone plasticizer, said plasticizer being a liquid at approximately 25° C. and having from one through five carbon atoms as the total number of carbon atoms in all the alkyl substituents with a maximum of three alkyl substituents contained on any one benzene ring, the ratio of plasticizer to resin being from 1:10 to 1:1.

3. A plasticized composition consisting essentially of polyvinyl acetate resin homopolymer and a plasticizer in intimate admixture, said plasticizer being isomers or isomeric mixtures selected from the group consisting of methyl benzophenone, dimethyl benzophenone, ethyl benzophenone, trimethylphenyl phenyl ketone, isopropyl benzophenone, tetramethylphenyl phenyl ketone, diethylphenyl phenyl ketone, methylpropylphenyl phenyl ketone, sec.-butylphenyl phenyl ketone, tolyl trimethylphenyl ketone, tolyl diethylphenyl ketone, p-tert.-butyltolyl phenyl ketone, trimethylphenyl phenyl ketone and mixtures thereof.

References Cited

UNITED STATES PATENTS

| 2,538,254 | 1/1951 | Lee et al. | 260—32.8 |
| 2,580,300 | 12/1951 | Johnson et al. | 260—32.8 |
| 2,580,301 | 12/1951 | Johnson et al. | 260—32.8 |
| 2,645,663 | 7/1953 | Newton | 260—591 |

FOREIGN PATENTS 113,776  1/1941  Australia.

OTHER REFERENCES

"Vinyl and Related Polymers" (Schildknecht) published by John Wiley & Sons, Inc., New York (1952) pp. 335, 427, 428 and 429 relied on.

MORRIS LIEBMAN, *Primary Examiner.*

J. W. BEHRINGER, J. FROME, *Assistant Examiners.*